(12) United States Patent
Hoke et al.

(10) Patent No.: US 9,138,725 B2
(45) Date of Patent: Sep. 22, 2015

(54) CATALYST MATERIALS FOR NO OXIDATION

(71) Applicant: BASF Corporation, Florham Park, NJ (US)

(72) Inventors: Jeffrey B. Hoke, North Brunswick, NJ (US); Olga Gerlach, Ludwigshafen (DE); Andreas Sundermann, Bensheim (DE)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 14/203,862

(22) Filed: Mar. 11, 2014

(65) Prior Publication Data

US 2014/0271427 A1    Sep. 18, 2014

Related U.S. Application Data

(60) Provisional application No. 61/777,532, filed on Mar. 12, 2013.

(51) Int. Cl.

| | |
|---|---|
| B01D 53/56 | (2006.01) |
| B01D 53/94 | (2006.01) |
| B01J 8/02 | (2006.01) |
| C01B 21/00 | (2006.01) |
| C01B 23/00 | (2006.01) |
| C01B 25/00 | (2006.01) |
| C01B 31/00 | (2006.01) |
| C01B 33/00 | (2006.01) |

(Continued)

(52) U.S. Cl.
CPC ............. B01J 23/63 (2013.01); B01D 53/9427 (2013.01); Y02T 10/24 (2013.01)

(58) Field of Classification Search
CPC ............ B01J 23/10; B01J 23/40; B01J 23/42; B01J 23/44; B01J 23/63; B01J 21/04; B01J 21/06; B01D 53/945
USPC ......... 502/304, 327, 332, 333, 334, 339, 355, 502/439; 423/213.5; 60/299; 422/170
See application file for complete search history.

(56) References Cited

U.S. PATENT DOCUMENTS

| 4,843,056 A | 6/1989 | Matsumoto |
| 4,961,917 A | 10/1990 | Byrne |

(Continued)

FOREIGN PATENT DOCUMENTS

| EP | 2390480 | 11/2011 |
| GB | 2481057 | 12/2011 |

(Continued)

OTHER PUBLICATIONS

English Language Abstract of JP 2011-230014 Nov. 17, 2011.

(Continued)

*Primary Examiner* — Cam N. Nguyen
(74) *Attorney, Agent, or Firm* — Servilla Whitney LLC

(57) ABSTRACT

A catalyst material for the oxidation of NO comprising a catalyst carrier including a ceria-alumina support having platinum and optionally palladium dispersed on the support is described. When palladium is present, the ratio of platinum to palladium by weight is at least 1:1. The amount of ceria in the support is in the range of 1% to 12% by weight. The catalyst material is useful for methods and systems of abating pollutants from automotive exhaust gas from lean burn engines.

19 Claims, 3 Drawing Sheets

(51) Int. Cl.

| | | |
|---|---|---|
| *C01B 35/00* | (2006.01) | |
| *C01G 28/00* | (2006.01) | |
| *C01G 30/00* | (2006.01) | |
| *F01N 3/10* | (2006.01) | |
| *B01J 23/00* | (2006.01) | |
| *B01J 23/02* | (2006.01) | |
| *B01J 23/08* | (2006.01) | |
| *B01J 23/10* | (2006.01) | |
| *B01J 23/40* | (2006.01) | |
| *B01J 23/42* | (2006.01) | |
| *B01J 23/44* | (2006.01) | |
| *B01J 23/56* | (2006.01) | |
| *B01J 21/04* | (2006.01) | |
| *B01J 23/63* | (2006.01) | |

(56) References Cited

U.S. PATENT DOCUMENTS

| | | | |
|---|---|---|---|
| 5,045,521 A * | 9/1991 | Lox et al. | 502/304 |
| 5,128,306 A | 7/1992 | Dettling et al. | |
| 5,179,059 A * | 1/1993 | Domesle et al. | 502/303 |
| 5,212,124 A * | 5/1993 | Newkirk | 501/88 |
| 5,462,907 A * | 10/1995 | Farrauto et al. | 502/304 |
| 5,492,878 A * | 2/1996 | Fujii et al. | 502/304 |
| 5,494,878 A * | 2/1996 | Murakami et al. | 502/304 |
| 5,516,497 A | 5/1996 | Speronello et al. | |
| 5,627,124 A * | 5/1997 | Farrauto et al. | 502/304 |
| 6,180,558 B1 * | 1/2001 | Kurokawa et al. | 502/304 |
| 6,221,804 B1 * | 4/2001 | Yamada et al. | 502/326 |
| 6,540,968 B1 * | 4/2003 | Huang et al. | 423/213.5 |
| 6,569,392 B1 * | 5/2003 | Li et al. | 423/213.5 |
| 7,678,734 B2 * | 3/2010 | Chigapov et al. | 502/304 |
| 7,769,619 B1 * | 8/2010 | Krysinski et al. | 705/7.13 |
| 7,947,238 B2 * | 5/2011 | Deeba | 423/213.2 |
| 8,057,767 B1 | 11/2011 | Qi et al. | |
| 8,057,768 B2 | 11/2011 | Schneider et al. | |
| 8,668,877 B2 * | 3/2014 | Wei et al. | 422/177 |
| 8,950,174 B2 * | 2/2015 | Hilgendorff | 60/299 |
| 2009/0048102 A1 | 2/2009 | Matsubara | |
| 2010/0180581 A1 | 7/2010 | Grubert et al. | |
| 2010/0233045 A1 | 9/2010 | Kim et al. | |
| 2011/0099975 A1 | 5/2011 | Bailey et al. | |
| 2011/0107745 A1 | 5/2011 | Mori et al. | |
| 2012/0055141 A1 | 3/2012 | Hilgendorff | |

FOREIGN PATENT DOCUMENTS

| | | |
|---|---|---|
| JP | 2011230014 A | 11/2011 |
| WO | WO-2012/029050 | 3/2012 |
| WO | WO-2012/071421 | 5/2012 |
| WO | WO-2012/085572 | 6/2012 |

OTHER PUBLICATIONS

International Search Report dated Aug. 26, 2014.

* cited by examiner

US 9,138,725 B2

CATALYST MATERIALS FOR NO OXIDATION

CROSS-REFERENCE TO RELATED APPLICATIONS

This application claims the benefit of priority under 35 U.S.C. §119(e) to U.S. Provisional Patent Application No. 61/777,532, filed on Mar. 12, 2013, which is hereby incorporated by reference in its entirety.

TECHNICAL FIELD

The present invention relates to catalyst materials useful for the oxidation of NO in an exhaust stream. In particular, the catalyst materials comprise a catalyst carrier including a ceria-alumina support having platinum and optionally palladium dispersed on the support, which are effective to oxidize NO in lean burn engine exhaust.

BACKGROUND

Operation of lean burn engines, e.g. diesel engines and lean burn gasoline engines, provide the user with excellent fuel economy and have relatively low emissions of gas phase hydrocarbons and carbon monoxide due to their operation at high air/fuel ratios under fuel lean conditions. Diesel engines, in particular, also offer significant advantages over gasoline engines in terms of their durability and their ability to generate high torque at low speed.

From the standpoint of emissions, however, diesel engines present problems more severe than their spark-ignition counterparts. Emission problems relate to particulate matter (PM), nitrogen oxides ($NO_x$), unburned hydrocarbons (HC) and carbon monoxide (CO). $NO_x$ is a term used to describe various chemical species of nitrogen oxides, including nitrogen monoxide (NO) and nitrogen dioxide ($NO_2$), among others. NO and $NO_2$ are of concern because they are believed to participate in photo-chemical smog formation through a series of reactions in the presence of sunlight and hydrocarbons. Furthermore, $NO_2$ is a significant contributor to acid rain, it has a high potential as an oxidant, and is a strong lung irritant. Particulates (PM) are also connected with respiratory problems. However, as engine operation modifications are made to reduce particulates and unburned hydrocarbons from diesel engines, the NO and $NO_2$ emissions tend to increase.

Effective abatement of $NO_x$ from lean burn engines is difficult to achieve because high $NO_x$ conversion rates typically require fuel-rich (i.e. high-reductant) conditions. Conversion of the $NO_x$ component of exhaust streams to innocuous components generally requires specialized $NO_x$ abatement strategies for operation under fuel lean conditions Oxidation catalysts comprising a precious metal dispersed on a refractory metal oxide support are used in treating the exhaust of diesel engines in order to convert both hydrocarbon and carbon monoxide gaseous pollutants to carbon dioxide and water. Typically, diesel oxidation catalysts (DOC) are formed on ceramic or metallic substrate carriers (such as flow-through monolith carriers) upon which one or more catalyst coating compositions are deposited. In addition to the conversions of gaseous HC, CO, and the soluble organic fraction (SOF) of particulate matter to carbon dioxide and water, oxidation catalysts that contain platinum group metals (which are typically dispersed on a refractory oxide support) promote the oxidation of NO to $NO_2$.

High surface area refractory metal oxides are often employed as a support for many of the catalytic components. For example, high surface area alumina materials, also referred to as "gamma alumina" or "activated alumina," used with oxidation catalysts typically exhibit a BET surface area in excess of 60 $m^2/g$, and often up to about 200 $m^2/g$ or more. Such activated alumina is usually a mixture of the gamma and delta phases of alumina, but may also contain substantial amounts of eta, kappa, and theta alumina phases. Refractory metal oxides other than activated alumina may be utilized as a support for at least some of the catalytic components in a given catalyst. For example, bulk ceria, zirconia, alpha-alumina, and other materials are known for such use. Although many of these materials have a lower BET surface area than activated alumina, that disadvantage tends to be offset by the greater durability of the resulting catalyst or a beneficial interaction with precious metal deposited on the support.

Catalysts used to treat the exhaust of internal combustion engines are less effective during periods of relatively low temperature operation, such as the initial cold-start period of engine operation because the engine exhaust is not at a temperature sufficiently high enough for efficient catalytic conversion of noxious components in the exhaust.

Oxidation catalysts comprising a platinum group metal (PGM) dispersed on a refractory metal oxide support are known for use in treating exhaust gas emissions from diesel engines. Platinum (Pt) is an effective metal for oxidizing CO and HC in a DOC after high temperature aging under lean conditions and in the presence of fuel sulfur. On the other hand, palladium (Pd) or Pd-rich diesel oxidation catalysts typically show higher light-off temperatures for oxidation of CO and HC, especially when used to treat exhaust containing high levels of sulfur (from high sulfur containing fuels). "Light-off" temperature for a specific component is the temperature at which 50% of that component reacts. DOCs comprising a large percentage of Pd may poison the activity of Pt to convert CO and HCs and may also make the catalyst more susceptible to sulfur poisoning. These characteristics have typically prevented the use of Pd-rich oxidation catalysts in lean burn operations, especially for light duty diesel application where engine temperatures remain below 250° C. for most driving conditions.

As mentioned above, the primary function of diesel oxidation catalysts in diesel vehicle applications has been to oxidize carbon monoxide and hydrocarbons to carbon dioxide and water. Recent implementation of selective catalytic reduction catalysts (SCR) in the exhaust systems of diesel vehicles in order to meet $NO_x$ emission legislation, however, has required the DOC to also function as an efficient NO oxidation catalyst. While SCR catalyst systems have been shown to maximize $NO_x$ reduction performance when the ratio of $NO_2$ to NO in the exhaust is approximately 50%, typical concentrations of $NO_2$ in the exhaust are much lower. Due to the high temperatures of combustion, the primary $NO_x$ component exiting the engine is NO.

Furthermore, DOC catalysts based on Pt/Pd are notoriously poor for oxidizing NO to $NO_2$. This is especially true for DOCs containing significant quantities of Pd (e.g. 2:1 or 1:1 weight ratio of Pt to Pd). For DOC applications, Pt and Pd are the preferred precious metals for oxidation of CO and HC present in diesel engine exhaust, and the choice of these active metals is due to a combination of performance (i.e. mixtures of Pt and Pd have improved performance compared to Pt and Pd alone) and cost (i.e. the price of Pd is significantly cheaper than that of Pt). However, as more Pd is added to the DOC, the NO oxidation performance declines, and SCR catalysts located downstream of the DOC are exposed to lower than optimal levels of $NO_2$. While the NO oxidation performance of the DOC can be increased by increasing the quantity of Pt (and correspondingly decreasing the amount of Pd), this is not a cost effective solution due to the high price of platinum relative to palladium. In addition, if the Pt/Pd ratio becomes too large, the CO and HC oxidation activity may actually decline.

As emissions regulations become more stringent, there is a continuing need to develop diesel oxidation catalysts systems that provide improved performance, for example, improved NO oxidation capability. There is also a need to utilize components of DOCs, for example, Pt and Pd, as effectively as possible.

Accordingly, it would be desirable to provide improved catalyst materials including carriers for platinum and palladium that exhibit improved performance.

SUMMARY

Embodiments of a first aspect of the invention are directed to a catalyst material for the oxidation of NO. In one or more embodiments, the catalyst material comprises a catalyst carrier including a ceria-alumina support having platinum and optionally palladium dispersed on the support. In one or more embodiments, when palladium is present, the ratio of platinum to palladium by weight is at least 1:1 and the amount of ceria in the support is in the range of 1% to 12% by weight.

In one or more embodiments, the ceria-alumina support further comprises silica, zirconia, baria, or magnesia.

In specific embodiments, the amount of Pt is in the range of 1-6 wt %, and the amount of Pd is in the range of 0-6 wt %. In one or more embodiments, the amount of ceria is in the range of 1-10 wt %. In specific embodiments, the amount of ceria is in the range of 1-6 wt %.

In one or more embodiments, the ratio of platinum to palladium by weight is at least 2:1.

A second aspect of the present invention is directed to a lean burn engine exhaust gas treatment system. The lean burn engine exhaust gas system can comprise catalyst material of one or more embodiments, a learn burn engine, and an exhaust gas conduit in fluid communication with the lean burn engine. In one or more embodiments, the catalyst material is present in the exhaust gas conduit.

In one or more embodiments, the system further comprises a diesel oxidation catalyst and/or a catalyzed soot filter (CSF). In one or more embodiments, the catalyst material can be located on the diesel oxidation catalyst and/or the CSF.

In one or more embodiments, the system further comprises a selective catalytic reduction catalyst located downstream from the catalyst material. The catalyst material according to one or more embodiments can be located on the diesel oxidation catalyst. In specific embodiments, the catalyst material is located on either or both of the diesel oxidation catalyst and the CSF.

A third aspect of the present invention is directed to a method of treating exhaust gas from a lean burn engine. In one or more embodiments, the method comprises contacting the exhaust gas stream with a catalyst material comprising a catalyst carrier including a ceria-alumina support having platinum and optionally palladium dispersed on the support. In one or more embodiments, when palladium is present, the ratio of platinum to palladium by weight is at least 1:1, and the amount of ceria in the support is in the range of 1% to 12% by weight.

In one or more embodiments, the ceria-alumina support further comprises silica, zirconia, baria, or magnesia.

In one or more embodiments, the exhaust gas comprises $NO_x$. In specific embodiments, the exhaust gas further comprises ammonia and/or urea.

A further aspect of the present invention is directed to a catalyst material for the oxidation of NO. In one or more embodiments, the catalyst material comprises a catalyst carrier including a ceria-alumina support having platinum and palladium dispersed on the support. In one or more embodiments, the ratio of platinum to palladium by weight is about 2:1 and the amount of ceria in the support is in the range of 1% to 5% by weight. In specific embodiments, the ceria-alumina support further comprises silica, zirconia, baria, or magnesia.

DETAILED DESCRIPTION

Figure 1:
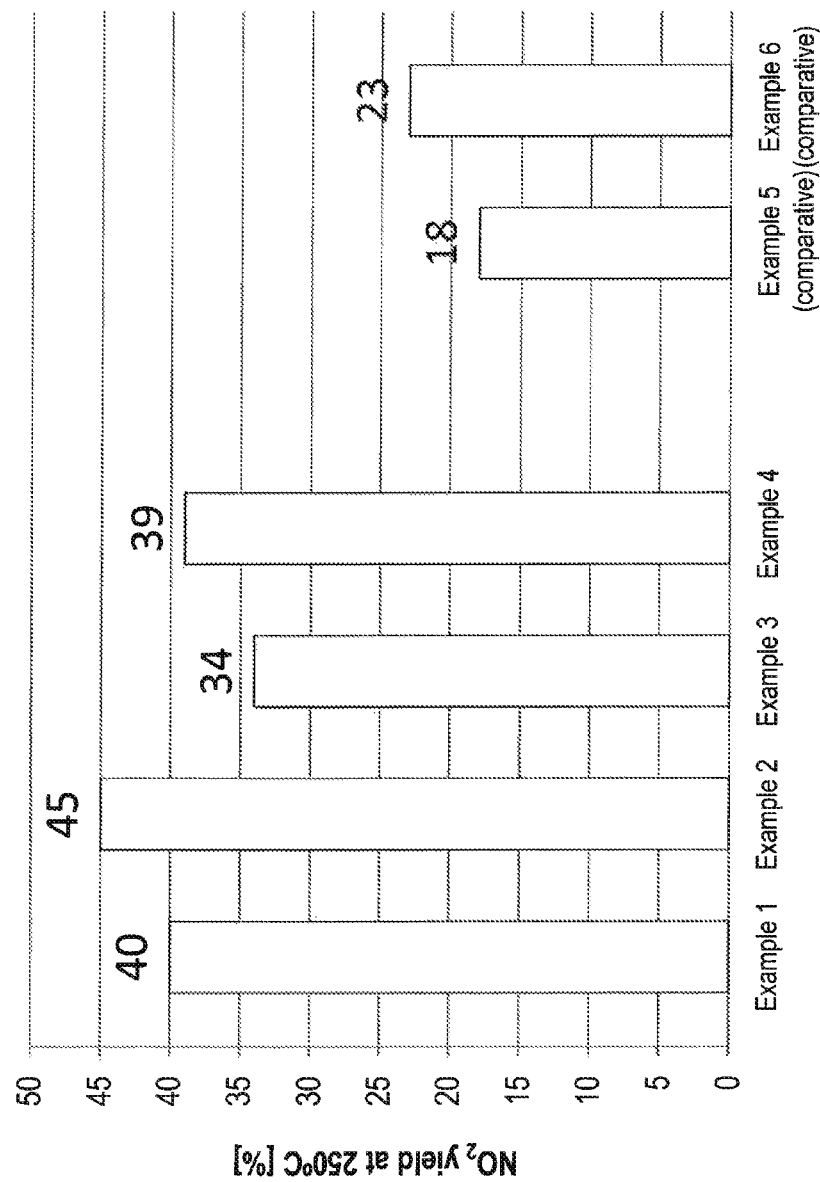
FIG. 1 is a graph showing the $NO_2$ formation results for catalysts according to the Examples.

Before describing several exemplary embodiments of the invention, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as disclosed.

For diesel oxidation catalyst applications, Pt and Pd are the preferred precious metals for oxidation of CO and HC present in diesel engine exhaust. The choice of these active metals is due to a combination of performance (mixtures of Pt and Pd have improved performance compared to Pt and Pd alone) and cost (the price of Pd is significantly less expensive than that of Pt). As more Pd is added to the diesel oxidation catalyst, however, the NO oxidation performance declines, and SCR catalysts located downstream of the DOC are exposed to lower than optimal levels of $NO_2$. While the NO oxidation performance of the DOC can be increased by increasing the quantity of Pt (and, correspondingly, decreasing the amount of Pd), this is not a cost effective solution due to the high price of platinum relative to palladium. Thus, there is a need to improve the NO oxidation capability of Pt/Pd diesel oxidation catalysts.

According to embodiments of the invention, therefore, it has been discovered that modifications to the catalyst support can substantially improve the oxidation of NO by Pt/Pd. Specifically, the use of an alumina Pt/Pd support comprising low amounts of ceria has been found to improve performance of diesel oxidation catalysts.

In a first aspect, one or more embodiments are directed to a catalyst material for the oxidation of NO. The catalyst material comprises a catalyst carrier including a ceria-alumina support having platinum and optionally palladium dispersed on the support. In one or more embodiments, when palladium is present, the ratio of platinum to palladium by weight is at least 1:1, and the amount of ceria in the support is in the range of 1% to 12% by weight.

With respect to the terms used in this disclosure, the following definitions are provided.

As used herein, the term "activated alumina" refers to a high surface area phase of alumina, such as, but not limited to, gamma-alumina.

As used herein, the term "catalyst carrier" refers to a composite support that carries a specific composition and/or a catalytic species such as platinum group metal or base metal oxide catalyst. As used herein, the term "support" refers to the underlying high surface area material (e.g., alumina, ceria-alumina) upon which additional chemical compounds or elements are carried. Thus, a support may comprise ceria-alumina particles and a catalyst carrier may comprise support particles of ceria-alumina having platinum and optionally palladium dispersed on the support.

More specifically, a "support" in a catalyst carrier is a material that receives precious metals, stabilizers, promoters, binders, and the like through association, dispersion, impregnation, or other suitable methods. Useful high-surface area supports include one or more refractory oxides. These oxides include, for example, silica, alumina, titania, ceria, baria, magnesia, and zirconia and mixed oxide forms thereof such as silica-alumina, aluminosilicates (which may be amorphous or crystalline), alumina-zirconia, alumina-ceria, titanium-alumina, and zirconium-silicate. In one embodiment, the support is selected from ceria-alumina, alumina doped with ceria, and silica-alumina doped with ceria. Alumina includes the members of the gamma, delta, theta or transitional aluminas, such as gamma and beta aluminas, and, if present, a minor amount of other refractory oxide, e.g., about up to 20 weight percent. For example, in other embodiments, the support is selected from ceria-containing mixed-oxide alumina supports including $CeO_2$—$ZrO_2$—$Al_2O_3$, $CeO_2$—$BaO$—$Al_2O_3$, and $CeO_2$—$MgO$—$Al_2O_3$. High surface area refractory metal oxide supports refer to support particles having high external surface area, pores larger than 20 Å, and a wide pore distribution. High surface area refractory metal oxide supports, e.g., ceria-alumina support materials, typically exhibit a BET surface area in excess of 60 square meters per gram ("$m^2/g$"), often up to about 200 $m^2/g$ or higher. "BET surface area" refers to the Brunauer, Emmett, Teller method for determining surface area by $N_2$ adsorption. Desirably, the active ceria-alumina has a specific surface area of 60 to 350 $m^2/g$, and typically 60 to 250 $m^2/g$. In specific embodiments, the loading of the ceria-alumina support on a monolithic substrate is from about 0.5 to about 6 $g/in^3$, more specifically from about 2 to about 5 $g/in^3$ and most specifically from about 3 to about 4 $g/in^3$ (all calculations based on coated monolith volume).

The term "substrate" refers to the monolithic material onto which the catalyst carrier is placed, typically in the form of a washcoat containing a plurality of carriers having catalytic species thereon. A washcoat is formed by preparing slurry containing a specified solids content (e.g., 20-50% by weight) of support in a liquid vehicle, which is then coated onto a substrate and dried to provide a washcoat layer.

As used herein, a "catalytic article" refers to a substrate having thereon a plurality of catalyst carriers having catalytic species thereon. A catalytic article can include one or more washcoats on a substrate.

As used herein, the term "platinum group metal" or "PGM" refers to one or more Group VIII chemical elements defined in the Periodic Table of Elements, including platinum (Pt), palladium (Pd), rhodium (Rh), osmium (Os), iridium (Ir), and ruthenium (Ru), and mixtures thereof.

In one or more embodiments, the catalyst carrier includes a ceria-alumina support having a mixture of platinum and palladium dispersed on the support. In one or more embodiments, the ratio of platinum to palladium by weight is at least 1:1. In one or more embodiments, the catalyst material has a Pt/Pd ratio of at least 2:1. In one or more embodiments, the catalyst material has a Pt/Pd ratio of at least 4:1. In specific embodiments, the catalyst material has a Pt/Pd ratio of at least 16:1. In one or more embodiments, the catalyst material comprises platinum only, and there is no palladium present.

Typically, the catalyst material can be deposited on a substrate to provide a desired amount of catalytic species. For example, the catalyst carrier may comprise about 20 to 300 $g/ft^3$, for example 20-150 $g/ft^3$ of a PGM catalytic species. The catalyst carrier deposited on the substrate is generally formed as a coated layer over most, if not all, of the surfaces of the substrate contacted. The platinum component may be present in an amount in the range of about 20 $g/ft^3$ to about 300 $g/ft^3$ (including 20, 30, 40, 50, 60, 70, 80, 90, 100, 150, 200, 250, and 300 $g/ft^3$). When both platinum and palladium are present, the total loading of palladium and platinum in some aspects is in the range of about 20 $g/ft^3$ to about 300 $g/ft^3$ (including 20, 30, 40, 50, 60, 70, 80, 90, 100, 150, 200, 250, and 300 $g/ft^3$). When Pd is present, the Pd component may be present in an amount in the range of about 1 $g/ft^3$ to about 150 $g/ft^3$ (including 5, 10, 20, 30, 40, 50, 60, 70, 80, 90, 100, 110, 120, 130, 140, and 150 $g/ft^3$). In one or more embodiments, there is no palladium present.

In general, palladium will be present in a loading of about 0.1 to about 6 wt % on the refractory oxide support. In one or more embodiments, there is no palladium present.

In general, the platinum will be present in a loading of about 1 to about 6 wt % on the refractory oxide support.

In specific embodiments, the catalyst material for the oxidation of NO comprises a catalyst carrier including a ceria-alumina support having a mixture of platinum and palladium dispersed on the support. The ratio of platinum to palladium by weight is about 2:1, and the amount of ceria in the support is in the range of 1% to 5% by weight. In one or more embodiments, the ceria-alumina support further comprises silica, zirconia, baria, or magnesia.

Thermally stable, high surface area alumina has long been used as a carrier for finely dispersed particles of noble metals. In the present invention, cerium oxide has been incorporated into the alumina particles or mixed with them as the support. In one or more embodiments, the support comprises a mixture of alumina with ceria. The amount of ceria in the support is in the range of 1% to 12% by weight. The support can comprise 1%, 2%, 3%, 4%, 5%, 6%, 7%, 8%, 9%, 10%, 11%, or 12% ceria by weight. Supports such as Ce/Al/Si (5/89/6) and Ce/Al (9/91) can be obtained from a commercial supplier, where the weight percentages are calculated on an oxide basis (ceria/alumina/silica=$CeO_2/Al_2O_3/SiO_2$ and ceria/alumina=$CeO_2/Al_2O_3$). Additionally, traditional alumina and silica-alumina supports from commercial suppliers can be doped with ceria in amounts from 1% to 12% by weight to provide ceria-alumina and ceria-alumina-silica supports according to one or more embodiments. The weight percentages are calculated on an oxide basis (ceria/alumina=$CeO_2/Al_2O_3$ and ceria/alumina/silica=$CeO_2/Al_2O_3/SiO_2$).

In one or more embodiments, a catalyst material for the oxidation of NO comprises a catalyst carrier including a ceria-alumina support having a mixture of platinum and palladium dispersed on the support. In one or more specific embodiments, the ratio of platinum to palladium by weight is about 2:1. The amount of ceria in the support is in the range of 1% to 6% by weight (including 1%, 1.5%, 2%, 2.5%, 3%, 3.5%, 4%, 4.5%, 5%, 5.5%, or 6% by weight).

In one or more embodiments, the support further comprises silica, zirconia, baria, or magnesia in amounts from 0% to 10% by weight (including 0%, 1%, 2%, 3%, 4%, 5%, 6%, 7%, 8%, 9%, or 10% by weight).

In one or more embodiments, the substrate is a ceramic or metal having a honeycomb structure. Any suitable substrate may be employed, such as a monolithic substrate of the type having fine, parallel gas flow passages extending therethrough from an inlet to an outlet face of the substrate such that passages are open to fluid flow therethrough. The passages, which are essentially straight paths from their fluid inlet to their fluid outlet, are defined by walls on which the catalytic material is coated as a washcoat so that the gases flow through the passages and contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such monolithic structures may contain up to about 700 or more flow passages (or "cells") per square inch of cross section, although far fewer may be used. For example, the monolith may have from about 7 to 600, more usually from about 100 to 400, cells per square inch ("cpsi"). The cells can have cross sections that are rectangular, square, circular, oval, triangular, hexagonal, or are of other polygonal shapes. The ceramic substrate may be made of any suitable refractory material, e.g. cordierite, cordierite-α-alumina, silicon nitride, silicon carbide, zircon mullite, spodumene, alumina-silica-magnesia, zircon silicate, sillimanite, a magnesium silicate, zircon, petalite, α-alumina, an aluminosilicate and the like.

The substrates useful for the catalyst carriers of embodiments of the present invention may also be metallic in nature and be composed of one or more metals or metal alloys. The metallic substrates may be employed in various shapes such as pellets, corrugated sheet or monolithic form. Specific examples of metallic substrates include the heat-resistant, base-metal alloys, especially those in which iron is a substantial or major component.

The catalyst materials according to embodiments of the present invention can be applied to the substrate by any known means in the art. For example, the catalyst material can be formed into a washcoat, which can be applied by spray coating, powder coating, or brushing or dipping a surface into the catalyst material.

In one or more embodiments, the catalyst material is disposed on a honeycomb substrate.

To provide a support comprising ceria-alumina particles, commercial supports can be used. Alternatively, commercial alumina and silica-alumina supports can be impregnated with ceria using incipient wetness techniques. For example, a commercial silica-alumina support can be impregnated to 100% incipient wetness with a Ce nitrate solution, with subsequent drying and calcination at 850° C. for 2 hours in air to provide a support comprising $SiO_2/Al_2O_3/CeO_2$. The supports can then be used to prepare a catalyst carrier according to one or more embodiments.

To provide a catalyst carrier with platinum and optionally palladium dispersed thereon, a ceria-alumina support is first impregnated with an aqueous mixture of metal salt solution comprising at least one of an acetate, nitrate, hydroxide, or carbonate, of palladium. The impregnated support is then subjected to drying/calcination to provide a catalyst carrier impregnated with palladium. These steps are also known as thermal fixation. Generally, thermal fixation means that a precursor salt of the desired precious metal in an aqueous solution is loaded onto the desired support, and the support is calcined at high temperatures, e.g., 400° C. or higher. Drying/calcining removes the free moisture and also decomposes the salts to form metals, oxides, hydroxides, and carbonates.

Once impregnated with palladium, the support is mixed with water to form a slurry. An aqueous solution of a platinum salt is then added. Platinum salts include, but are not limited to, Platinum A, platinum nitrate, platinum tetra-amine acetate, platinum tetra-amine nitrate, and platinum tetra-amine hydroxide. The slurry is then milled to achieve a particle size typically required for monolith coating (e.g. d90<20 μm). The slurries are dried by stirring, and then the powders are calcined in air at 450° C. to provide the catalyst material.

Ceria containing oxide materials are not known to be effective supports for Pt based catalysts. Without intending to be bound by theory, it is thought that ceria in close proximity to Pt tends to keep the Pt in an oxidized, and therefore catalytically less active, form. In one or more embodiments, however, a ceria containing alumina support improves NO oxidation while maintaining good carbon monoxide and hydrocarbon performance. The amount of $NO_2$ formed at 250° C. by the ceria-alumina support catalysts according to one or more embodiments is nearly double that formed by the reference alumina and silica-alumina based catalysts. Neither the CO nor HC light-off performance of the catalysts prepared with a ceria-alumina support is significantly impacted compared to that of reference catalysts.

Incorporation of ceria into a commercially supplied silica-alumina support prior to impregnation with precious metals provides a significant improvement in $NO_2$ formation capability. According to one or more embodiments, the amount of $NO_2$ formed at 250° C. by the ceria containing silica-alumina support catalysts after 800° C. aging is double that formed by the reference silica-alumina based catalysts. Additionally, in one or more embodiments, a higher amount of ceria (about 6% versus about 4%) was found to be beneficial.

It is expected that the catalyst carriers prepared according to the principles described above would be useful in preparing appropriate exhaust gas purification catalytic articles useful in emission treatment or control systems. For example, these exhaust gas purification catalyst carriers could be coated on one or more appropriate substrates in order to treat and/or purify gaseous products discharged from an internal combustion engine.

An emissions treatment system for a lean burn engine can comprise a learn burn engine, an exhaust gas conduit in fluid communication with the lean burn engine, and a catalyst material according to one or more embodiments. The catalyst material can be present in the exhaust gas conduit.

The location of the catalyst material according to one or more embodiments within the exhaust treatment system is not restricted to a particular catalyst module (e.g., diesel oxidation catalyst or catalyzed soot filter (CSF)). However, the catalyst material according to one or more embodiments should be located in a position upstream of an SCR catalyst, if present. In one or more embodiments, the catalyst material of the present invention can be located on a DOC and/or a CSF. In one or more embodiments, a selective catalytic reduction catalyst (SCR) can be located downstream of the catalyst material. In a specific embodiment, a system comprises, in order, a diesel oxidation catalyst, a soot filter in the form of a wall flow filter, the soot filter being catalyzed to provide a CSF and a SCR catalyst, with a reductant injector immediately upstream from the SCR catalyst. The catalyst material according to the present invention can be utilized in the diesel oxidation catalyst or the CSF of the specific embodiment.

In the case of a DOC/SCR system, the improved catalyst material according to one or more embodiments would be located on the DOC. In the case of DOC/SCRF (SCR catalyst on a filter, such as a wall flow filter) system, the improved catalyst material could additionally be located on the filter. In the case of a DOC/CSF/SCR system, the improved catalyst material according to one or more embodiments could be located on either or both the DOC or CSF, but preferably, at a minimum, on the CSF for maximum $NO_2$ formation.

The SCR component can be located downstream of a soot filter component. A suitable SCR catalyst component for use in the emission treatment system is able to effectively catalyze the reduction of the $NO_x$ component at temperatures below 600° C., so that adequate $NO_x$ levels can be treated even under conditions of low load which typically are associated with lower exhaust temperatures. Preferably, the SCR catalyst article is capable of converting at least 50% of the $NO_x$ component to $N_2$, depending on the amount of reductant added to the system. Another desirable attribute for the SCR composition is that it possesses the ability to catalyze the reaction of $O_2$ with any excess $NH_3$ to $N_2$ and $H_2O$, so that $NH_3$ is not emitted to the atmosphere. Useful SCR catalyst compositions used in the emission treatment system should also have thermal resistance to temperatures greater than 650° C. Such high temperatures may be encountered during regeneration of the upstream catalyzed soot filter.

Suitable SCR catalyst compositions are described, for instance, in U.S. Pat. No. 4,961,917 (the '917 patent) and U.S. Pat. No. 5,516,497, which are both hereby incorporated by reference in their entirety. Compositions disclosed in the '917 patent include one or both of an iron and a copper promoter present in a zeolite in an amount of from about 0.1 to 30 percent by weight, preferably from about 1 to 5 percent by weight, of the total weight of promoter plus zeolite. In addition to their ability to catalyze the reduction of $NO_x$ with $NH_1$ to $N_2$, the disclosed compositions can also promote the oxidation of excess $NH_3$ with $O_2$, especially for those compositions having higher promoter concentrations. Other specific SCR compositions that may be used in accordance with one or more embodiments of the invention include 8-ring, small pore molecular sieves, for example, those having the structure type selected from the group consisting of AEI, AFT, AFX, CHA, EAB, ERI, KFI, LEV, SAS, SAT, and SAV. In a specific embodiment, the 8-ring small pore molecular sieve has the CHA structure and is a zeolite. The CHA zeolite may contain copper. Exemplary CHA zeolites have a silica to alumina ratio (SAR) greater than about 15, and copper content exceeding about 0.2 wt %. In a more specific embodiment, the mole ratio of silica to alumina is from about 15 to about 256, and copper content from about 0.2 wt % to about 5 wt %. Other useful compositions for SCR include nonzeolitic molecular sieves having the CHA crystal structure. For example, silicoaluminophosphates such as SAPO-34, SAPO-44 and SAPO-18 may be used in accordance with one or more embodiments. Other useful SCR catalysts can include a mixed oxide including one or more of $V_2O_5$, $WO_3$ and $TiO_2$.

Embodiments of a further aspect of the present invention, are directed to a method of treating exhaust gas. The exhaust gas can comprise $NO_x$, ammonia, and/or urea. The method comprises contacting the exhaust gas with a catalyst material comprising a catalyst carrier including a ceria-alumina support having platinum and optionally palladium dispersed on the support. The amount of ceria in the support is in the range of 1% to 12% by weight. When palladium is present, the ratio of platinum to palladium by weight is at least 1:1.

The use of the terms "a" and "an" and "the" and similar references in the context of describing the materials and methods discussed herein (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods.

The invention is now described with reference to the following examples. Before describing several exemplary embodiments of the invention, it is to be understood that the invention is not limited to the details of construction or process steps set forth in the following description. The invention is capable of other embodiments and of being practiced or being carried out in various ways.

EXAMPLES

Example 1

Ceria-alumina support from a commercial supplier nominally comprising 9% ceria ($CeO_2$) by weight and having a BET surface area of 100 $m^2/g$ and an internal pore volume of 0.81 cc/g was impregnated with Pd nitrate solution using standard incipient wetness techniques. The Pd impregnated powder was placed into deionized water, and Pt A solution was added. After reducing the pH to 4 by addition of acid, the slurry was milled to a particle size 90% less than 15 μm. The milled slurry was dried by stirring and calcined at 450° C. for 2 hours in air. Total Pt loading on the ceria-alumina support was 2.6% and total Pd loading was 1.3% (Pt/Pd weight ratio=2:1).

Example 2

Ceria-silica-alumina support from a commercial supplier nominally comprising 5% ceria ($CeO_2$) and 6% silica ($SiO_2$) by weight and having a BET surface area of 208 $m^2/g$ and an internal pore volume of 1.03 cc/g was impregnated with Pd nitrate solution using standard incipient wetness techniques. The Pd impregnated powder was placed into deionized water, and Pt A solution was added. After reducing the pH to 4 by addition of acid, the slurry was milled to a particle size 90% less than 15 μm. The milled slurry was dried by stirring and calcined at 450° C. for 2 hours in air. Total Pt loading on the ceria-silica-alumina support was 2.6% and total Pd loading was 1.3% (Pt/Pd weight ratio=2:1).

Example 3

A ceria-silica-alumina support material nominally comprising 4% ceria ($CeO_2$), silica ($SiO_2$), and 91% alumina ($Al_2O_3$) by weight was prepared by impregnation of a commercial silica-alumina support nominally comprising 5% silica ($SiO_2$) by weight and having a BET surface area of 180 $m^2/g$ and an internal pore volume of 0.70 cc/g to 100% incipient wetness with a Ce nitrate solution followed by subsequent drying and calcination at 850° C. for 2 hours in air. The support material was then impregnated with Pd nitrate solution using standard incipient wetness techniques. The Pd impregnated powder was placed into deionized water, and Pt A solution was added. After reducing the pH to 4 by addition of acid, the slurry was milled to a particle size 90% less than 15 μm. The milled slurry was dried by stirring and calcined at 450° C. for 2 hours in air. Total Pt loading on the ceria-silica-alumina support was 2.6% and total Pd loading was 1.3% (Pt/Pd weight ratio=2:1).

Example 4

A ceria-silica-alumina support material nominally comprising 6% ceria ($CeO_2$), 5% silica ($SiO_2$), and 89% alumina ($Al_2O_3$) by weight was prepared by impregnation of the commercial silica-alumina support used in Example 3 to 100% incipient wetness with a Ce nitrate solution followed by subsequent drying and calcination at 850° C. for 2 hours in air. The support material was then impregnated with Pd nitrate solution using standard incipient wetness techniques. The Pd impregnated powder was placed into deionized water, and Pt A solution was added. After reducing the pH to 4 by addition of acid, the slurry was milled to a particle size 90% less than 15 μm. The milled slurry was dried by stirring and calcined at 450° C. for 2 hours in air. Total Pt loading on the ceria-silica-alumina support was 2.6% and total Pd loading was 1.3% (Pt/Pd weight ratio=2:1).

Example 5

Comparative

The commercial silica-alumina support used in Example 3 was impregnated with Pd nitrate solution using standard incipient wetness techniques. The Pd impregnated powder was placed into deionized water, and Pt A solution was added. After reducing the pH to 4 by addition of acid, the slurry was milled to a particle size 90% less than 15 μm. The milled slurry was dried by stirring and calcined at 450° C. for 2 hours in air. Total Pt loading on the silica-alumina support was 2.6% and total Pd loading was 1.3% (Pt/Pd weight ratio=2:1).

Example 6

Comparative

Alumina support from a commercial supplier having a BET surface area of 150 $m^2/g$ and an internal pore volume of 0.85 cc/g was impregnated with Pd nitrate solution using standard incipient wetness techniques. The Pd impregnated powder was placed into deionized water, and Pt A solution was added. After the pH was reduced to 4 by addition of acid, the slurry was milled to a particle size 90% less than 15 μm. The milled slurry was dried by stirring and calcined at 450° C. for 2 hours in air. Total Pt loading on the alumina support was 2.6% and total Pd loading was 1.3% (Pt/Pd weight ratio=2:1).

Example 7

A ceria-silica-alumina support material nominally comprising 1% ceria ($CeO_2$), 5% silica ($SiO_2$), and 94% alumina ($Al_2O_3$) by weight was prepared by impregnation of the commercial silica-alumina support used in Example 3 to 100% incipient wetness with a Ce nitrate solution followed by subsequent drying and calcination at 850° C. for 2 hours in air. The support material was then impregnated with Pd nitrate solution using standard incipient wetness techniques. The Pd impregnated powder was placed into deionized water, and Pt A solution was added. After reducing the pH to 4 by addition of acid, the slurry was milled to a particle size 90% less than 15 μm. The milled slurry was dried by stirring and calcined at 450° C. for 2 hours in air. Total Pt loading on the ceria-silica-alumina support was 2.6% and total Pd loading was 1.3% (Pt/Pd weight ratio=2:1). Two additional samples were prepared similarly at the same Pt/Pd weight ratio using ceria-silica-alumina supports comprising 3% and 5% ceria ($CeO_2$), respectively.

Example 8

Preparation of the three Pt/Pd/ceria-silica-alumina samples described in Example 7 was repeated using the identical procedure of Example 7 except that the amount of Pt and Pd was adjusted to achieve a Pt/Pd weight ratio of 4:1 while maintaining the same total precious metal loading of 3.9%.

Example 9

Comparative

Reference samples using silica-alumina support without ceria were prepared at Pt/Pd weight ratios of 2:1 and 4:1 according to the procedure described in Example 5.

Example 10

A ceria-alumina support material nominally comprising 1% ceria ($CeO_2$) and 99% alumina ($Al_2O_3$) by weight was prepared by impregnation of a commercial boehmite alumina support having a BET surface area of 250 $m^2/g$ and a pore volume of 0.5 cc/g after activation at 550° C. to 100% incipient wetness with a Ce nitrate solution followed by subsequent drying and calcination at 850° C. for 2 hours in air. The support material was then impregnated with Pd nitrate solution using standard incipient wetness techniques. The Pd impregnated powder was placed into deionized water, and Pt A solution was added. After reducing the pH to 4 by addition of acid, the slurry was milled to a particle size 90% less than 15 μm. The milled slurry was dried by stirring and calcined at 450° C. for 2 hours in air. Total Pt loading on the ceria-alumina support was 2.6% and total Pd loading was 1.3% (Pt/Pd weight ratio=2:1). Two additional samples were prepared similarly at the same Pt/Pd weight ratio using ceria-alumina supports comprising 3% and 5% ceria ($CeO_2$), respectively.

Example 11

Preparation of the three Pt/Pd/ceria-alumina samples described in Example 10 was repeated using the identical procedure of Example 10 except that the amount of Pt and Pd was adjusted to achieve a Pt/Pd weight ratio of 4:1 while maintaining the same total precious metal loading of 3.9%.

Example 12

Comparative

Reference samples using the boehmite alumina support of examples 10 and 11 but without ceria were prepared at Pt/Pd weight ratios of 2:1 and 4:1 according to the procedure described in Example 6.

Example 13

Pt/Pd catalysts at a weight ratio of 2:1 were prepared according to the procedure of Example 1 using the following ceria-containing mixed-oxide alumina supports obtained from commercial suppliers (nominal oxide compositions by weight in parentheses): $CeO_2$—$ZrO_2$—$Al_2O_3$ (10%-10%-80%), $CeO_2$—BaO—$Al_2O_3$ (10%-10%-80%), and $CeO_2$—MgO—$Al_2O_3$ (8%-20%-72%).

Results

The catalyst powders of Examples 1-6 were crushed and sieved to a target fraction of 250-500 μm. The catalysts were then aged at 800° C. in an atmosphere of 10% $H_2O$ in air for 20 hours. The aged catalyst powders (100 mg of each) were then tested for CO, HC, and NO oxidation performance using a fully automated test rig having 48 parallel fixed bed reactors made from stainless steel with an inner diameter of 7 mm for each individual reactor. The catalysts were tested under steady-state operation at 120, 140, 160, 180, 200, 220, 250, and 300° C. by passing a gas mixture simulating diesel exhaust (1500 ppm CO, 500 ppm $C_1$ HC, 100 ppm NO, 13% $O_2$, 10% $CO_2$, 5% $H_2O$ in $N_2$) through each reactor at each temperature for 4 min with a total flow of 45 L/h.

NO oxidation results for the catalysts prepared in Examples 1-6 are summarized in FIG. 1. The amount of $NO_2$ formed at 250° C. by the new ceria-containing alumina support catalysts (Examples 1 and 2) was nearly double that formed by the reference alumina based catalysts (Examples 5 and 6). Incorporation of ceria into the reference silica-alumina support (Examples 3 and 4) prior to impregnation with precious metal provided a significant improvement in $NO_2$ formation capability. The amount of $NO_2$ formed at 250° C. by the new ceria-containing silica-alumina support catalysts (Examples 3 and 4) after 800° C. aging was nearly double that formed by the reference silica-alumina based catalyst (Example 5). A higher amount of ceria (6% vs. 4%) was also found to more beneficial.

Figure 2:
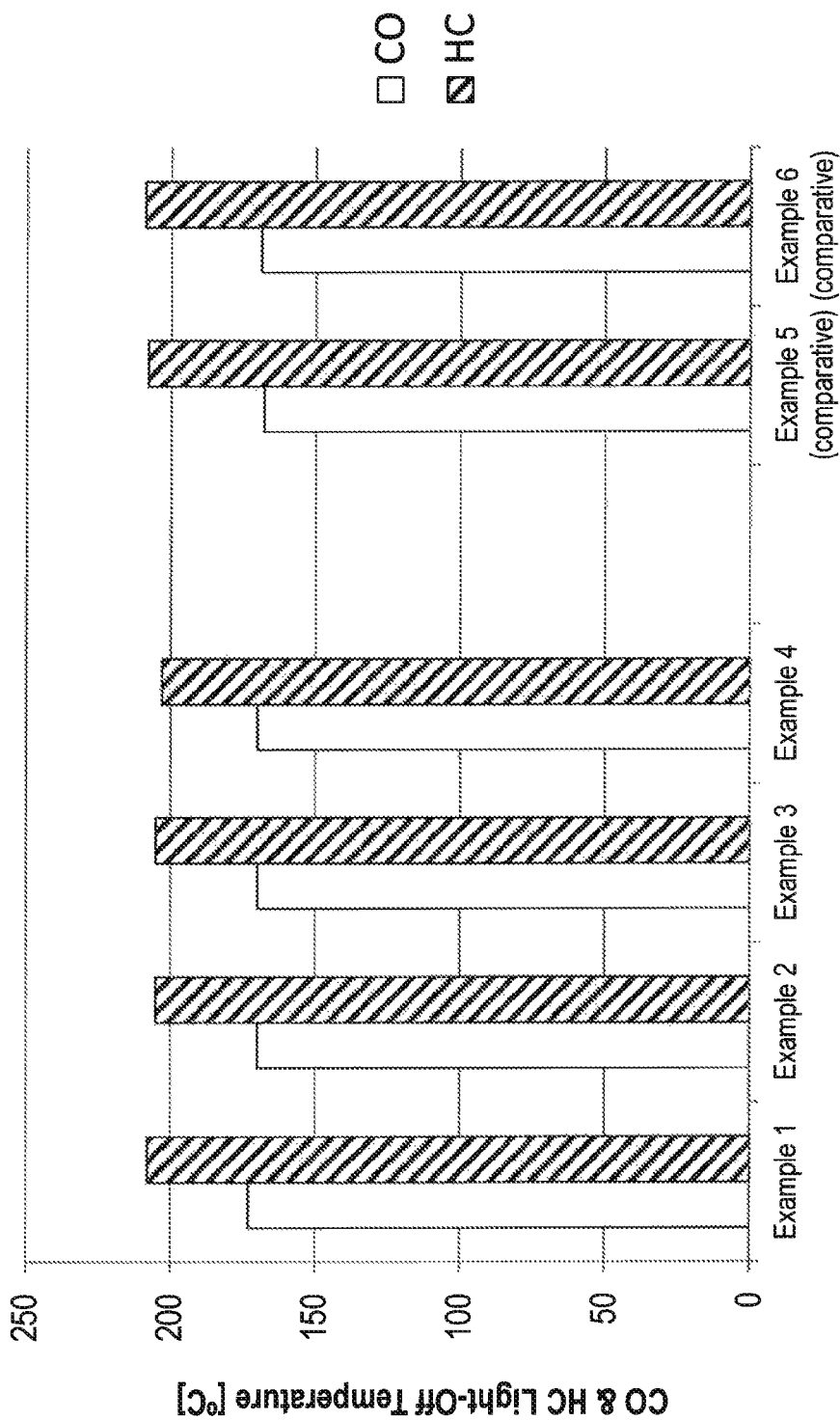
FIG. 2. is a graph showing the CO and HC light-off results for catalysts according to the Examples.
Figure 3:
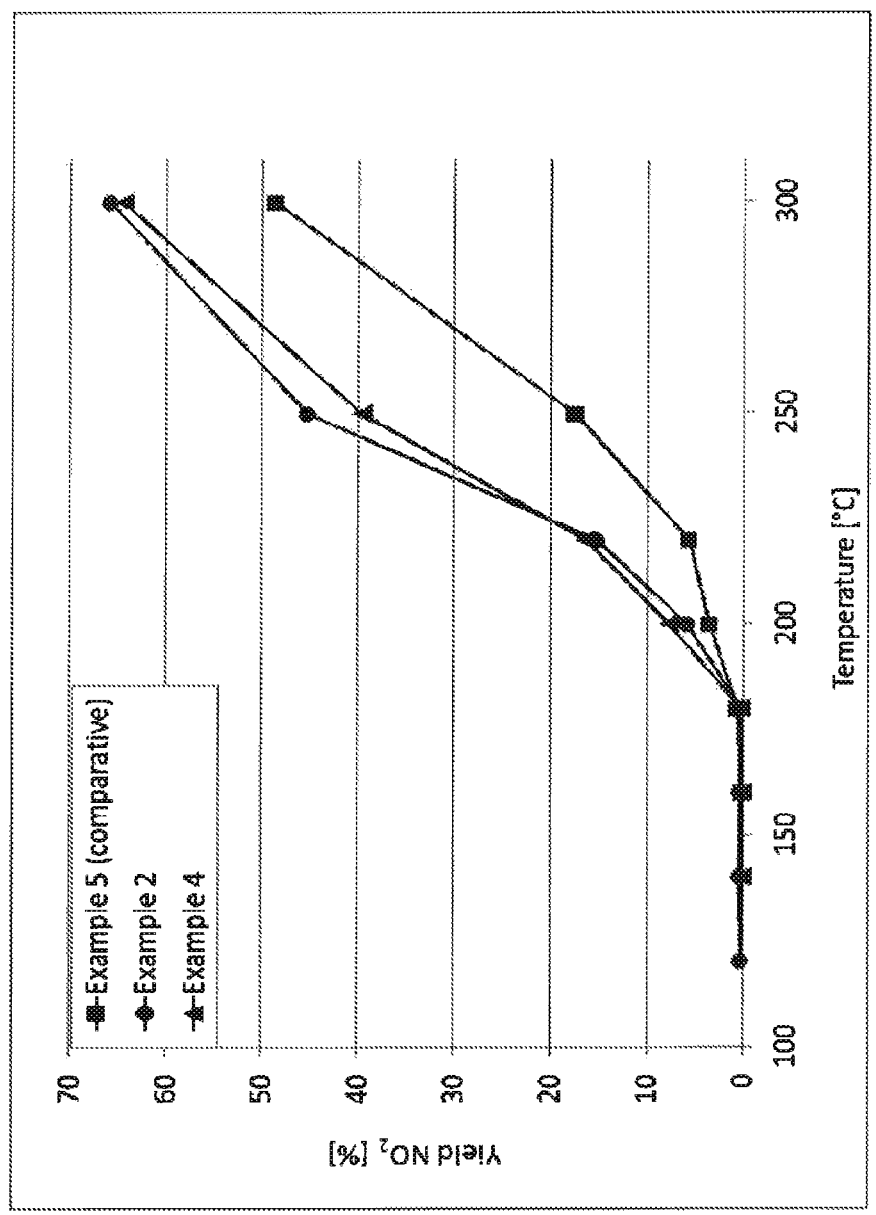
FIG. 3 is a graph showing the $NO_2$ formation results for catalysts according to the Examples.

In addition, as shown in FIG. 2, the CO light-off performance of the catalysts prepared with the new supports (Examples 1-4) was only slightly impacted compared to that of the reference catalysts, while the HC light-performance was slightly improved. These results are quite unexpected since ceria-containing oxide materials are not known to be effective supports for Pt based catalysts since ceria in dose proximity to Pt tends to keep the Pt in an oxidized and, thus, in a catalytically less effective form. The catalysts prepared according to embodiments of the invention, however, improve NO oxidation while maintaining good CO and HC performance. The superior NO oxidation results for the new ceria-containing supports as a function of temperature are illustrated in FIG. 3.

The catalyst powders of Examples 7-13 were crushed and sieved to a target fraction of 250-500 μm. The catalysts were then aged at 800° C. in an atmosphere of 10% $H_2O$ in air for 20 hours. The aged catalyst powders (100 mg of each) were then tested for CO, HC, and NO oxidation performance using a fully automated test rig having 48 parallel fixed bed reactors made from stainless steel with an inner diameter of 7 mm for each individual reactor. The catalysts were tested under steady-state operation at 120, 135, 150, 165, 180, 195, 210, 225, 250, 300 and 350° C. by passing a gas mixture simulating diesel exhaust (700 ppm CO, 440 ppm $C_1$ HC, 70 ppm NO, 10% $O_2$, 10% $CO_2$, 5% $H_2O$ in $N_2$) through each reactor at each temperature for 4 min with a total flow of 45 L/h. The reactant gas composition was slightly different that that used for testing the powders prepared in Examples 1-6 with lower CO, HC, and NO concentrations used.

The catalyst powders of Examples 7-12 were aged and tested similarly to those of Examples 1-6. NO oxidation results for the samples prepared using the commercial silica-alumina support are summarized in Table 1. Incorporation of ceria into the reference silica-alumina support (Examples 7 and 8) prior to impregnation with precious metal provided a significant improvement in $NO_2$ formation capability above ceria levels of 1%. Highest NO oxidation performance was obtained with the samples containing 3 and 5% ceria. For the samples with a Pt/Pd weight ratio of 2:1, the amount of $NO_2$ formed at 250° C. using the new ceria-containing silica-alumina support with either 3 or 5% ceria after 800° C. aging was nearly double that formed by the reference silica-alumina based catalyst (Example 9). Although the amount of $NO_2$ formed for the 4:1 samples was slightly higher than that of the 2:1 samples at ceria loadings of 0 and 1%, results for 2:1 and 4:1 samples were equal at ceria loadings of 3 and 5%.

TABLE 1

NO Oxidation Results for Pt/Pd Catalysts Prepared Using the Ceria-Silica-Alumina Powders Prepared in Examples 7-9

| | $NO_2$ Formed (%) at 250° C. | |
|---|---|---|
| Ceria Amount (%) | Pt/Pd = 2:1 | Pt/Pd = 4:1 |
| 0 | 16 | 22 |
| 1 | 18 | 22 |
| 3 | 29 | 27 |
| 5 | 30 | 31 |

NO oxidation results for the samples prepared using the commercial boehmite alumina support are summarized in Table 2. Incorporation of ceria into the reference alumina support (Examples 10 and 11) prior to impregnation with precious metal provided some improvement in $NO_2$ formation capability. For the 2:1 samples, the amount of $NO_2$ formed at 250° C. after 800° C. aging was 1.7 times that formed by the reference alumina based catalyst.

TABLE 2

NO Oxidation Results for Pt/Pd Catalysts Prepared Using the Ceria-Alumina Powders Prepared in Examples 10-12

| | $NO_2$ Formed (%) at 250° C. | |
|---|---|---|
| Ceria Amount (%) | Pt/Pd = 2:1 | Pt/Pd = 4:1 |
| 0 | 10 | 30 |
| 1 | 13 | 30 |
| 3 | 14 | 32 |
| 5 | 17 | 32 |

CO oxidation results for the samples prepared using the commercial silica-alumina, support are summarized in Table 3 while CO oxidation results for the samples prepared using the commercial boehmite alumina support are summarized in Table 4. Incorporation of ceria into the reference alumina and silica-alumina supports had no impact on CO light-off temperature within experimental error of the test system. No effect of ceria loading was observed, and best performance was obtained with the samples prepared at a Pt/Pd weight ratio of 4:1.

TABLE 3

CO Oxidation Results for Pt/Pd Catalysts Prepared Using the Ceria-Silica-Alumina Powders Prepared in Examples 7-9

| | CO Light-Off Temperature (° C.) | |
|---|---|---|
| Ceria Amount (%) | Pt/Pd = 2:1 | Pt/Pd = 4:1 |
| 0 | 171 | 166 |
| 1 | 170 | 167 |
| 3 | 168 | 168 |
| 5 | 170 | 167 |

TABLE 4

CO Oxidation Results for Pt/Pd Catalysts Prepared Using the Ceria-Alumina Powders Prepared in Examples 10-12

| | CO Light-Off Temperature (° C.) | |
|---|---|---|
| Ceria Amount (%) | Pt/Pd = 2:1 | Pt/Pd = 4:1 |
| 0 | 171 | 166 |
| 1 | 170 | 165 |

TABLE 4-continued

CO Oxidation Results for Pt/Pd Catalysts Prepared Using the Ceria-Alumina Powders Prepared in Examples 10-12

| Ceria Amount (%) | CO Light-Off Temperature (° C.) | |
|---|---|---|
| | Pt/Pd = 2:1 | Pt/Pd = 4:1 |
| 3 | 170 | 165 |
| 5 | 171 | 166 |

NO oxidation results for the samples prepared in Example 13 using the commercial mixed oxide ceria-alumina supports are summarized in Table 5. Compared to the alumina reference sample prepared without ceria in Example 12 (Table 2), four to five times as much $NO_2$ was formed at 250° C. Compared to the silica-alumina reference sample prepared without ceria in Example 9 (Table 1), approximately three times as much $NO_2$ was formed at 250° C.

TABLE 5

NO Oxidation Results for Pt/Pd Catalysts Prepared Using the Mixed Oxide Ceria-Alumina Powders Prepared in Example 13

| | $NO_2$ Formed (%) at 250° C. |
|---|---|
| $CeO_2$—$ZrO_2$—$Al_2O_3$ (10%-10%-80%) | 54 |
| $CeO_2$—BaO—$Al_2O_3$ (10%-10%-80%) | 41 |
| $CeO_2$—MgO—$Al_2O_3$ (8%-20%-72%) | 51 |

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as disclosed. Thus, it is intended that the present invention include modifications and variations that are within the scope of the appended claims and their equivalents.

What is claimed is:

1. A catalyst material for the oxidation of NO comprising a catalyst carrier including a ceria-alumina support having platinum and palladium dispersed on the support, wherein the ratio of platinum to palladium by weight is at least 1:1 and the amount of ceria in the support is in the range of 1% to 12% by weight.

2. The catalyst material of claim 1, wherein the ceria-alumina support further comprises silica, zirconia, baria, or magnesia.

3. The catalyst material of claim 1, wherein the amount of Pt is in the range of 1-6 wt %.

4. The catalyst material of claim 3, wherein the amount of Pd is in the range of 0.1-6 wt %.

5. The catalyst material of claim 1, wherein the amount of ceria is in the range of 1-10 wt %.

6. The catalyst material of claim 5, wherein the amount of ceria is in the range of 1-6 wt %.

7. The catalyst material of claim 1, wherein the ratio of platinum to palladium by weight is at least 2:1.

8. The catalyst material of claim 1, wherein the ratio of platinum to palladium by weight is at least 4:1.

9. A lean burn engine exhaust gas treatment system comprising the catalyst material of claim 1, a learn burn engine, and an exhaust gas conduit in fluid communication with the lean burn engine, wherein the catalyst material is present in the exhaust gas conduit.

10. The system of claim 9, further comprising a diesel oxidation catalyst and/or a catalyzed soot filter (CSF).

11. The system of claim 10, wherein the catalyst material of claim 1 is located on the diesel oxidation catalyst.

12. The system of claim 10, wherein the catalyst material of claim 1 is located on either or both of the diesel oxidation catalyst and the CSF.

13. The system of claim 9, further comprising a selective catalytic reduction catalyst located downstream from the catalyst material of claim 1.

14. A method of treating exhaust gas from a lean burn engine comprising contacting the exhaust gas stream with a catalyst material comprising a catalyst carrier including a ceria-alumina support having platinum and optionally palladium dispersed on the support, wherein, when palladium is present, the ratio of platinum to palladium by weight is at least 1:1, and the amount of ceria in the support is in the range of 1% to 12% by weight.

15. The method of claim 14, wherein the ceria-alumina support further comprises silica, zirconia, baria, or magnesia.

16. The method of claim 14, wherein the exhaust gas comprises $NO_x$.

17. The method of claim 16, wherein the exhaust gas further comprises ammonia and/or urea.

18. A catalyst material for the oxidation of NO comprising a catalyst carrier including a ceria-alumina support having platinum and palladium dispersed on the support, wherein the ratio of platinum to palladium by weight is about 2:1 and the amount of ceria in the support is in the range of 1% to 6% by weight.

19. The catalyst material of claim 18, wherein the ceria-alumina support further comprises silica, zirconia, baria, or magnesia.

* * * * *